United States Patent
Salmela et al.

(10) Patent No.: US 11,101,978 B2
(45) Date of Patent: Aug. 24, 2021

(54) ESTABLISHING AND MANAGING IDENTITIES FOR CONSTRAINED DEVICES

(71) Applicant: TELEFONAKTIEBOLAGET LM ERICSSON (PUBL), Stockholm (SE)

(72) Inventors: Patrik Salmela, Espoo (FI); John Fornehed, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 170 days.

(21) Appl. No.: 15/551,683

(22) PCT Filed: Feb. 18, 2015

(86) PCT No.: PCT/EP2015/053401
§ 371 (c)(1),
(2) Date: Aug. 17, 2017

(87) PCT Pub. No.: WO2016/131482
PCT Pub. Date: Aug. 25, 2016

(65) Prior Publication Data
US 2018/0048462 A1 Feb. 15, 2018

(51) Int. Cl.
*H04L 9/06* (2006.01)
*H04W 12/06* (2021.01)
(Continued)

(52) U.S. Cl.
CPC .............. *H04L 9/0643* (2013.01); *H04L 9/14* (2013.01); *H04L 9/30* (2013.01); *H04L 9/3247* (2013.01);
(Continued)

(58) Field of Classification Search
None
See application file for complete search history.

(56) References Cited

U.S. PATENT DOCUMENTS 7,600,255 B1   10/2009   Baugher
8,069,470 B1 *  11/2011   Montenegro ......... H04L 63/126
                                                      726/3
(Continued)

OTHER PUBLICATIONS

Eldefrawy et al., OTP-based Two-Factor Authentication Using Mobile Phones, 2011 Eighth International Conference on Information Technology: New Generations, 327-331 (Year: 2011).*

(Continued)

*Primary Examiner* — Luu T Pham
*Assistant Examiner* — Edward X Long
(74) *Attorney, Agent, or Firm* — Sage Patent Group

(57) ABSTRACT

A method (100) for establishing a new identity for a constrained device is disclosed, wherein the device has an existing identity and is associated with an asymmetric key pair comprising a device public key and a device private key. The method comprises applying a hash function to the existing identity (106) and setting the resulting value as the new identity for the constrained device (108), wherein the existing identity comprises at least a first generation hash value of a hash chain formed by applying the hash function to the device public key. Also disclosed is a method (200) for managing an identity of a constrained device, the device being associated with an asymmetric key pair comprising a device public key and a device private key. The method comprises maintaining a record of the device public key (202), receiving an identity from the device (204), sequentially applying a hash function to the device public key to generate a hash chain of the device public key (206), and identifying a hash value in the hash chain matching the identity received from the device (208).

7 Claims, 7 Drawing Sheets

(51) Int. Cl.
 H04L 9/32 (2006.01)
 H04W 12/37 (2021.01)
 H04W 12/0431 (2021.01)
 H04L 9/30 (2006.01)
 H04L 9/14 (2006.01)
 H04W 4/70 (2018.01)
 H04W 12/75 (2021.01)
(52) U.S. Cl.
 CPC ....... *H04W 12/0431* (2021.01); *H04W 12/06* (2013.01); *H04W 12/37* (2021.01); *H04L 2209/38* (2013.01); *H04W 4/70* (2018.02); *H04W 12/75* (2021.01)

(56) References Cited

U.S. PATENT DOCUMENTS

| | | | |
|---|---|---|---|
| 2007/0130465 | A1 | 6/2007 | Zeng et al. |
| 2008/0195865 | A1* | 8/2008 | Nikander ............ H04L 63/0442 713/170 |
| 2009/0290506 | A1* | 11/2009 | Nakano ................ H04L 43/50 370/252 |
| 2010/0063932 | A1 | 3/2010 | Camenisch et al. |
| 2010/0238811 | A1* | 9/2010 | Rune .................... H04W 8/26 370/248 |
| 2012/0110326 | A1* | 5/2012 | Rossi ................ H04W 12/0602 713/162 |
| 2013/0117572 | A1* | 5/2013 | Berczes ................ H04L 9/3247 713/178 |
| 2014/0165215 | A1* | 6/2014 | Kurkure .................. G06F 21/10 726/30 |

OTHER PUBLICATIONS

He et al, An Enhanced Public Key Infrastructure to Secure Smart Grid Wireless Communication Networks, 2014 IEEE Network, pp. 10-16 (Year: 2014).*
International Search Report and Written Opinion issued in Application No. PCT/EP2015/053401 dated Nov. 2, 2015, 10 pages.
Yang, Ming Hour et al., "Protect mobile RFID location privacy using dynamic identity", Cognitive Informatics, 7th IEEE International Conference on, IEEE, NJ, USA, (dated Aug. 14, 2008), pp. 366-374, XP031345085, ISBN: 978-1-4244-2538-9.
Ng, Ching Yu et al. "Practical RFID Ownership Transfer Scheme" Journal of Computer Security—2010 Workshop on RFID Security (RFIDSec'10 Asia), vol. 19(2), Apr. 2011, 20 pages.
Mahmoud, Mohamed M.E.A. et al., "A Scalable Public Key Infrastructure for Smart Grid Communications", Globecom 2013—Communication and Information System Security Symposium, IEEE, ISBN: 978-1-4799-1353-4, 6 pages (2013 IEEE).
Office Action issued in EP application No. 15705304.2 dated Jun. 6, 2019; 06 pages.
European Office Action issued in corresponding Application No. 15705304.2 dated Jan. 23, 2020, 04 Pages.
European Office Action issued in corresponding EP Application No. 15705304.2 dated Jun. 23, 2020, 06 Pages.

* cited by examiner

ESTABLISHING AND MANAGING IDENTITIES FOR CONSTRAINED DEVICES

CROSS REFERENCE TO RELATED APPLICATION(S)

This application is a 35 U.S.C. § 371 National Stage of International Patent Application No. PCT/EP2015/053401, filed Feb. 18, 2015, designating the United States, the disclosure of which is incorporated by reference.

TECHNICAL FIELD

The present invention relates to methods for establishing and managing identities for constrained devices. The present invention also relates to a constrained device and to a network element, and to a computer program configured to carry out methods for establishing and managing identities of constrained devices.

BACKGROUND

In 3GPP networks, subscription credentials used for identification and authentication of a device towards the network, and towards some services, are stored on a Universal Integrated Service Card (UICC). The UICC operates as a secure storage and execution environment, ensuring that the credentials stored on the UICC can be used but not modified by the user of the device. Frequently, only a part of the credentials can be read and shared by the device, while remaining credentials can be used by operations run on the UICC but cannot be read by the device. Examples include a device identity, such as the IMSI, which is stored on the UICC and can be read and shared by the device, and a device private key, which is used by cryptographic operations run on the UICC but cannot be read by the device. For devices without a UICC, similar security measures can be taken by introducing a trusted execution environment and trusted storage, which can be implemented using both hardware and software.

Among the credentials stored on a UICC for devices in 3GPP networks, an asymmetric key pair and certificate may be included. A certificate is issued by a trusted third party, and may be accompanied by a signature, guaranteeing that the owner of the certificate is who it claims to be. The certificate is connected to the asymmetric key pair, the public key of which is often included in the certificate and acts as a tool for verifying the identity of the certificate holder. The private key is known only to the certificate holder and is never shared. In some cases, asymmetric key pairs can also be used without a certificate; this is known as raw public key (RPK).

A device public key is often used as the identity of the device with which it is associated, particularly in the case of RPK. As a public key tends to be rather long, a hash of the public key may also be used as the device identity, provided the hash value is long enough to be statistically unique and thus suitable as an identifier. An advantage of this arrangement is that any party having the public key of a device can verify that the device actually owns the corresponding private key, and thus also the identity. Also, from the public key it is easy to calculate the hashed value of the key that can be used as an identifier, and thus verify that the hashed value is owned by the device. However, as hash functions are essentially one way, it is more or less impossible to calculate the original public key from the hashed value of the public key that is used as an identifier. U.S. Pat. No. 8,069,470 discloses using a hash of a device public key together with some other predefined data as a device identity.

As network connectivity extends to increasing numbers of devices not associated with a human user, also referred to as Machine Type Communication (MTC) devices, many such devices connect directly to the internet using 3GPP technology. Such devices have 3GPP radio capabilities and credentials for access authentication. However, for cost, performance, operational environment or other reasons, some devices will not be able to connect directly to the internet. They may instead connect to a gateway using for example low power radio, the gateway having 3GPP radio capability and credentials for global connectivity. Such devices are often referred to as constrained devices, owing to the limitations on their functionality imposed by their operational environment or situation.

When managing devices, whether directly or indirectly connected to a network, it is important to be able to identify the devices. This means that devices should have an identifier and means for authenticating themselves, that is to prove that they own the identity provided. For devices with 3GPP credentials a simple option is to use the 3GPP identity. However, for constrained devices which do not have 3GPP credentials, some other solution is needed. One option is certificates or alternatively RPKs, held in a secure storage and execution environment implemented in hardware and software.

While certificates or RPKs may be used as identities of constrained devices, the management of the identities of these devices is difficult. If the credentials are stored in a trusted execution environment to which the device owner has no access, then the device identity is secure but change of ownership of the device is problematic, as the new owner is faced with a device that could potentially access the services of the previous owner. If the device owner is given access to the secure storage where the certificate and/or asymmetric key pair are held, the problem of change of ownership is addressed but the device becomes vulnerable to attacks on the identity of the device as well as to misconfigurations.

For a device with 3GPP credentials, the solution to this problem is to switch SIM cards when a device changes owner, so allowing the device to obtain a new identity not linked to the previous subscription. However, for constrained devices having a hardware/software executed trusted storage and execution environment, there are no easily removable or exchangeable parts. While it may in some instances be possible to take the device to a manufacturer or other third party in possession of a master key for managing the identity, in many cases the identity may be burned into the device and thus unchangeable. In addition, such manual identity management may not be possible if the device is deployed in a challenging environment, and in all cases significantly adds to the operational expenditure associated with the device.

SUMMARY

It is an aim of the present invention to provide methods, apparatus and computer readable media which at least partially address one or more of the challenges discussed above.

According to a first aspect of the present invention, there is provided a method for establishing a new identity for a constrained device, the device having an existing identity and being associated with an asymmetric key pair comprising a device public key and a device private key. The method comprises applying a hash function to the existing identity and setting the resulting value as the new identity for the constrained device, wherein the existing identity comprises at least a first generation hash value of a hash chain formed by applying the hash function to the device public key.

For the purposes of the present specification, a constrained device comprises a device in which at least one of power, capacity, device complexity and/or network connectivity is subject to limitation. A constrained device may for example comprise a machine type communication device, a battery powered device or any other device having the above discussed limitations.

According to examples of the invention, the method may further comprise storing the new identity in a secure storage in the constrained device.

According to examples of the invention, the method may further comprise receiving an instruction to generate a new identity.

According to examples of the invention, the method may further comprise verifying the authenticity of the received instruction before proceeding to apply a hash function to the existing identity and set the resulting value as the new identity, such that only an authorised instruction can result in establishing a new identity.

According to examples of the invention, the method may further comprise sending the new identity to a control node. The control node may for example comprise a Bootstrapping Server or may comprise any other node managing or keeping a record of device identities.

According to examples of the invention, the method may further comprise incrementing an identity generation counter. In some examples, the method may further comprise storing the identity generation counter with the new identity in the secure storage.

According to examples of the invention, the method may further comprise receiving a request for device identity from a communication network function, and sending the new identity and the identity generation counter to the communication network function. The communication network function may for example comprise a control node or may comprise a network service function.

According to examples of the invention, the method may further comprise sending the identity generation counter to a control node.

According to examples of the invention, the method may further comprise generating a signature using the device private key, and signing at least one of the new identity or the identity generation counter. Sending the new identity or the identity generation counter may in such examples comprise sending the signed new identity or identity generation counter.

According to another aspect of the present invention, there is provided a method for managing an identity of a constrained device, the device being associated with an asymmetric key pair comprising a device public key and a device private key. The method comprises maintaining a record of the device public key, receiving an identity from the device, sequentially applying a hash function to the device public key to generate a hash chain of the device public key, and identifying a hash value in the hash chain matching the identity received from the device.

In some examples, the method may further comprise storing the identified hash value matching the identity received from the device with the device public key.

According to examples of the invention, identifying a hash value in the hash chain matching the identity received from the device may comprise checking each value in the generated hash chain against the received identity until a matching value is discovered, up to a predetermined generation limit of the hash chain.

According to examples of the invention, the method may further comprise receiving an identity generation counter from the device with the identity. In such examples, generating a hash chain of the device public key may comprise sequentially applying the hash function to the device public key a number of times equal to the received identity generation counter, and identifying a hash value in the hash chain matching the identity received from the device may comprise checking the resulting hash chain value against the received identity.

In some examples of the invention, the identified hash chain value may be generated through the sequential application of the hash function at different times; for example on receipt of a generation counter, the method may comprise retrieving an already calculated hash chain value of an earlier generation of the hash chain, and performing only the additional applications of the hash function required to obtain the hash chain value indicated by the received generation counter. Thus if a hash chain of n elements has already been calculated, and a generation counter of value n+1 is received, the method may comprise retrieving the n'th hash value of the hash chain and performing a single additional application of the hash function.

According to examples of the invention, the method may further comprise receiving a signature from the device, the signature being generated with the device private key, verifying the signature with the device public key, and if the verification is unsuccessful, discarding the received identity. The signature may in some examples be calculated over the received identity, over a received generation counter, over both the received identity and generation counter, over a nonce, over some combination of these elements or over the entire contents of the packet containing the received identity According to examples of the invention, the method may further comprise determining a generation of the identified value in the hash chain and storing the generation with the device public key in the record. In some examples, determining a generation of the identified value may comprise receiving an identity generation counter from the device. In other examples, determining a generation of the identified value may comprise counting the number of times the hash function was applied to the device public key to obtain the hash value matching the received identity.

According to examples of the invention, the method may further comprise checking the determined generation against an existing stored generation, and replacing the existing stored generation with the determined generation if the determined generation is higher than the existing stored generation.

According to examples of the invention, the method may further comprise allowing the device access to a service on successful identification of a hash value in the hash chain matching the identity received from the device. In further examples, the method may further comprise performing additional checks following successful identification of a hash value and before accepting a constrained device. For example, the method may further comprise, on identification of a hash value in the hash chain matching the identity received from the device, checking that the identity is an identity that is to be served by the service and authenticating the identity, for example using a private key signature attached to the identity or using some other protocol.

According to examples of the invention, the method may further comprise determining a generation of the identified value in the hash chain, checking the determined generation against a stored identity generation counter, and allowing the device access to a service if the determined generation matches the stored identity generation counter. A similar check may also be carried out on the basis of the identity, if the service has already verified and stored the current generation of identity.

In some examples, the identity generation counter may be internally stored with a function at which the method is carried out, or in other examples it may be externally stored, for example in an externally hosted database. In some examples of the invention, determining a generation of the identified value may comprise receiving an identity generation counter from the device. Alternatively, determining a generation of the identified value may comprise counting the number of times the hash function was applied to the device public key to obtain the hash value matching the received identity.

According to another aspect of the present invention, there is provided a computer product configured to carry out a method according to the first or second aspects of the present invention.

According to another aspect of the present invention, there is provided a computer program product comprising computer readable material having stored thereon a computer program product according to the third aspect of the present invention.

According to another aspect of the present invention, there is provided a constrained device comprising a processor and a memory, the memory containing instructions executable by the processor such that the constrained device is operable to carry out a method according to the first aspect of the present invention.

According to another aspect of the present invention, there is provided a network element comprising a processor and a memory, the memory containing instructions executable by the processor such that the network element is operable to carry out a method according to the second aspect of the present invention. In some examples, the network element may be a control node or a network function such as a network service function.

The processors of the constrained device and network element may be any combination of one or more of a suitable central processing unit (CPU), multiprocessor, microcontroller, digital signal processor (DSP), application specific integrated circuit (ASIC) etc., capable of executing software instructions contained in a computer program such as that of the third aspect of the present invention, stored in a computer program product such as that of the fourth aspect of the present invention.

According to another aspect of the present invention, there is provided a constrained device, the device having an existing identity and being associated with an asymmetric key pair comprising a device public key and a device private key. The device comprises a hash module for applying a hash function to the existing identity, and an identity module for setting the resulting value as the new identity for the constrained device, wherein the existing identity comprises at least a first generation hash value of a hash chain formed by applying the hash function to the device public key.

According to examples of the invention, the device may further comprise a storage module for storing the new identity in a secure storage in the constrained device.

According to examples of the invention, the device may further comprise a receiver module for receiving an instruction to generate a new identity.

According to examples of the invention, the device may further comprise a transmitter module for sending the new identity to a control node.

According to examples of the invention, the device may further comprise a counter module for incrementing an identity generation counter.

According to examples of the invention, the device may further comprise a receiver module for receiving a request for device identity from a communication network function, and a transmitter module for sending the new identity and the identity generation counter to the communication network function.

According to examples of the invention, the device may further comprise a transmitter module for sending the identity generation counter to a control node.

According to examples of the invention, the device may further comprise a signature module for generating a signature using the device private key, and for signing at least one of the new identity or the identity generation counter; wherein the transmitter module for sending the new identity or the identity generation counter may comprise a transmitter module for sending the signed new identity or identity generation counter.

According to another aspect of the present invention, there is provided a network element for managing an identity of a constrained device, the device being associated with an asymmetric key pair comprising a device public key and a device private key. The network element comprises a record module for maintaining a record of the device public key, a receiver module for receiving an identity from the device, a hash module for sequentially applying a hash function to the device public key to generate a hash chain of the device public key, and an identifying module for identifying a hash value in the hash chain matching the identity received from the device.

According to examples of the invention, the identifying module for identifying a hash value in the hash chain matching the identity received from the device may comprise a checking module for checking each value in the generated hash chain against the received identity until a matching value is discovered, up to a predetermined generation limit of the hash chain.

According to examples of the invention, the network element may further comprise a receiver module for receiving an identity generation counter from the device with the identity, and the hash module for sequentially applying a hash function to the device public key to generate a hash chain of the device public key may comprise a hash module for sequentially applying the hash function to the device public key a number of times equal to the received identity generation counter. The identifying module for identifying a hash value in the hash chain matching the identity received from the device may comprise a checking module for checking the resulting hash chain value against the received identity.

According to examples of the invention, the network element may further comprise a receiver module for receiving a signature from the device, the signature being generated with the device private key, and a signature module for verifying the signature with the device public key, and for discarding the received identity if the verification is unsuccessful.

According to examples of the invention, the network element may further comprise a generation module for determining a generation of the identified value in the hash chain and a record module for storing the generation with the device public key in the record.

According to examples of the invention, the network element may further comprise a generation module for checking the determined generation against an existing stored generation, and a record module for replacing the existing stored generation with the determined generation if the determined generation is higher than the existing stored generation.

According to examples of the invention, the network element may further comprise a service module for allowing the device access to a service on successful identification of a hash value in the hash chain matching the identity received from the device.

According to examples of the invention, the network element may further comprise a generation module for determining a generation of the identified value in the hash chain and for checking the determined generation against a stored identity generation counter, and a service module for allowing the device access to a service if the determined generation matches the stored identity generation counter.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Figure 1:
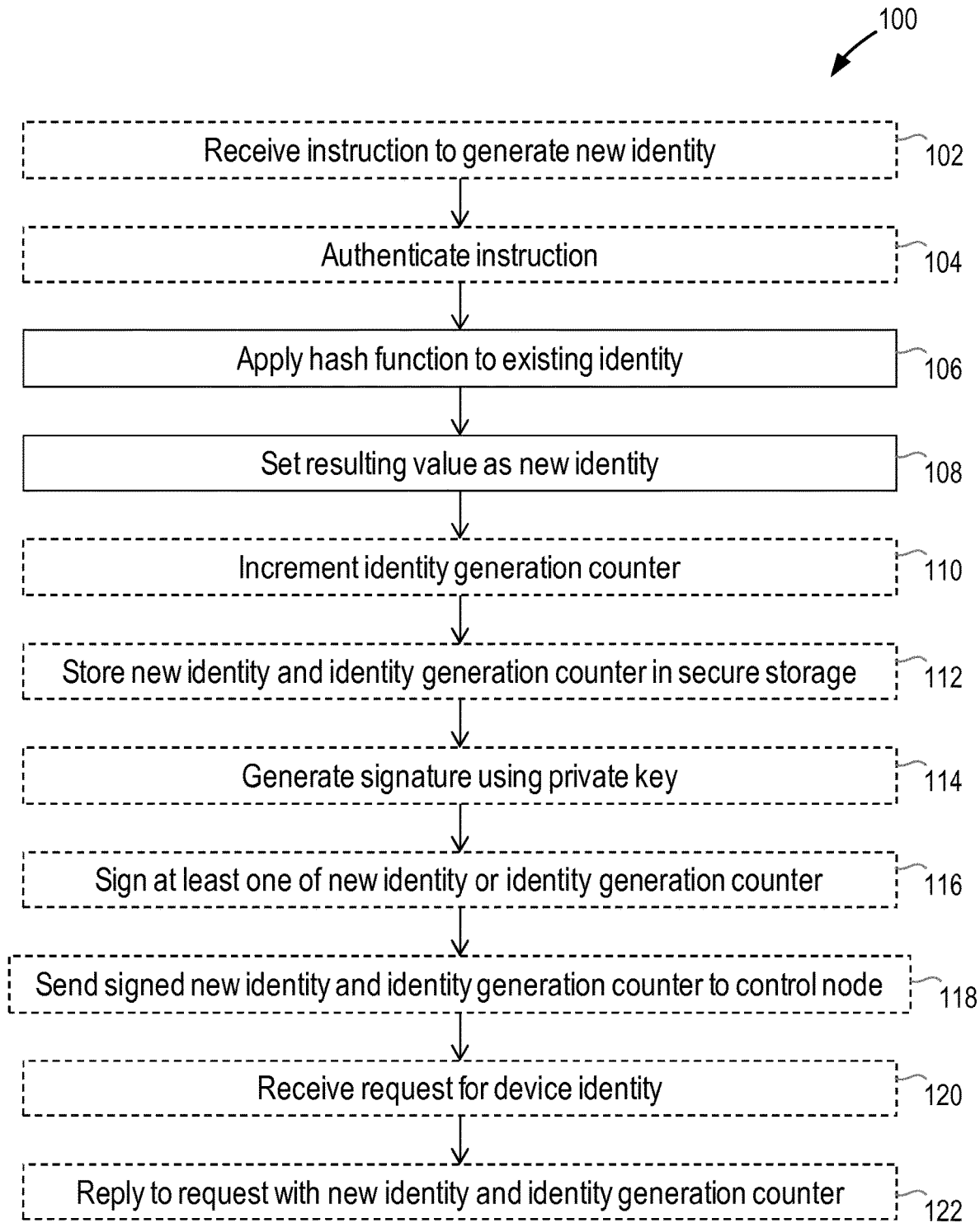
FIG. 1 is a flow chart illustrating process steps in a method for establishing a new identity for a constrained device.

Aspects of the present invention provide methods for establishing a new identity for a constrained device, according to which the values in a hash chain of a device public key are used as identities for the device. The public key may be part of an asymmetric key pair issued to the device for example during manufacturing. The initial identity of the device is set to be the hash function applied to the device's public key, that is the first generation hash value in the hash chain. The constrained device then generates a new identity, for example when the device changes owner, by applying the hash function to its previous identity. The first time a new identity is generated, the existing identity is hash (public key). Subsequent actions to generate new identities each involve applying the hash function to the previous identity, with the generation number of the hash chain increasing by one each time the generation process takes place.

A hash function is a one-way function that is applied to an input value to provide a hash of the input value: hash_val1=hash(val1). A hash chain is constructed by sequentially applying the hash function to a previous result of the hash function: hash_val2=hash(hash_val1), and so on: hash_val4=hash(hash(hash(hash(val1)))). An entity in possession of both the original value and one of the hashed values can verify that the hashed value is a result of performing multiple hash operations by running the hash function multiple times on the value and checking the result against the hashed value. As a hash is a one way function, it is more or less impossible, or at least infeasible, to calculate the original value from a hashed value: there is no reverse function to generate an input value from a hashed value.

Aspects of the present invention apply to constrained devices, which for the purposes of the present specification include devices in which at least one of power, capacity, device complexity and/or network connectivity is subject to limitation. A constrained device may for example comprise a machine type communication device.

When a constrained device is deployed, it needs to know through which entity it should connect to the communication network. It also needs to know the identity of its manager and where to store data, as well as other practical information relevant to the functioning of the device. This information may be configured into the device at manufacture. However, constrained devices are typically employed in large scale deployments, meaning the number of devices to be individually configured may be large. In addition, the interfaces for device configuration in constrained devices may be limited and difficult to use, meaning manual configuration of the devices can be very costly. An alternative is to use a Bootstrapping Server to direct a device to its management portal, via which the device can be configured automatically. This approach requires only the identity of a device's Bootstrapping Server to be configured into the device, thus reducing the initial configuration burden. In some examples, a device manufacturer may maintain such a Bootstrapping Server together with a database, or "phonebook" of the devices. Device owners can add entries to the Bootstrapping Server for their devices, specifying among other information the management server the device should be redirected to. A device can always connect to the Bootstrapping Server to learn its home management function, which the device owner may change by updating the information in the Bootstrapping Server If a device is reset and it loses all its configuration information, it can connect to the Bootstrapping Server and try to find information about where to connect to.

Aspects of the present invention also provide methods for managing an identity of a constrained device, which methods may for example be carried out at a network element such as a Bootstrapping Server, a management node or a service function. The methods involve verifying a received device identity by generating a hash chain of the device public key and identifying a hash value in the hash chain matching the identity received from the device. Additional actions such as confirming and storing a new identity, discarding an old identity or improperly generated new identity, or allowing conditional service access on the basis of the identity or its generation may also be conducted, according to various different examples of the invention.

An overview of different aspects of the invention is provided below, before detailed actions at participating nodes, including a constrained device and various network elements, are discussed with reference to FIGS. 1 to 4.

In the following overview, a constrained device, the identity of which is to be established and managed, is assumed to have a trusted execution environment and trusted storage, which may be implemented in a combination of hardware and/or software. The private key of an asymmetric key pair (either including a certificate or RPK) is stored in a protected manner, so that it cannot be read or changed by the device or its owner but it can be used for performing cryptographic operations in a secure manner. The corresponding public key (and/or certificate) is also securely stored, but with read access to the key afforded to the device, ensuring the public key can be used and shared by the device.

An initial identity for the device is generated by applying a one-way hash function to the device public key: ID=hash (pub key). This identity is stored in protected memory so that a device user cannot modify it. A generation counter (Gi) of the identity may also be stored with the identity, indicating the number of times the hash function has been applied to the public key to generate the current identity. When the initial identity is generated, the Generation counter Gi is initialized to 1. Each time the hash function is used to generate a new identifier from the old one, Gi is increased by one.

A device manufacturer or some other third party maintains a database, or "phonebook" of the devices, containing at least the public key of each device and optionally other relevant information relating to the device. The third party may in some examples install the asymmetric key pair in the device, or the key pair may be installed by the manufacturer, who may then contract the third party to maintain the phonebook of devices. The phonebook may be used by services including a Bootstrapping Server or network services as a list of devices the Bootstrapping Server serves, or a list of devices subscribing to a particular network service. In further examples, the phonebook may comprise a phonebook manager that performs certain verification procedures using the information stored in the phonebook.

Whenever a device interacts with a network element such as a Bootstrapping Server or service function, the device presents its identity, that is the value in its hash chain that it is currently using as its identity. The contacted network element can verify that the hashed value has been generated from the device public key by retrieving the device public key from the phonebook or from its own internal storage and performing the corresponding hash calculation itself. In other examples, some protocols may allow the device to send its public key and/or certificate together with its identity message. In such examples, the public key and/or certificate may be used to match the session to one of the subscriptions at the network element, allowing the network element to verify that the hashed value has been generated from the device public key as described above. In still other examples, the contacted network element may simply forward the received identity to the phonebook and rely upon the phonebook/phonebook manager to perform the hash calculations and verify the identity on behalf of the contacted network element. The contacted network element or phonebook manager may also verify that the device owns the public key by having the device authenticate its identity using its corresponding private key. This may be used for example to generate a signature which is applied to the identity and which can be verified using the device public key.

The entity verifying the device identity (Bootstrapping Server, phonebook manager, network service function etc) may simply run a number of hash functions on the device public key until it finds the identifier presented by the device. In some examples, the entity verifying the device identity may keep a record of the number of times the hash function was applied in order to generate the received identity. In other examples, the entity may receive the identity generation counter Gi together with the identity. In such examples, the value of Gi informs the entity of the number of times the hash function should be applied in order to generate the received identity.

When the identity has been verified, the verifying entity, in the form of a Bootstrapping Server, phonebook manager or other network element, knows the generation counter (Gi) of the currently used identity and this may be stored together with the device public key and the identity. Storing both the identity and the generation counter value may facilitate calculating new identities from the currently stored identity. In addition, the network entity does not need to verify this identity multiple times; once it has checked that the identity is part of the hash chain based on the device public key it does not need to do that check again for new sessions. The network entity may maintain a mapping from current hash value identity to the corresponding public key so that for subsequent sessions the public key can be identified from the current identity. When connecting to a service for the first time, or if using a new identity, the device may provide its certificate or public key to the service in addition to the identity, unless for example the identity has been configured to the service, in which case the public key may only be used for authentication purposes.

When the device presents a new identity, which may be accompanied by a new generation counter value Gi, the verifying entity can check that the Gi presented by the device is the same as or greater than the Gi value currently stored. In this manner the use of an older identity is blocked, by always requiring the last known or a newer identity generation. In some examples, before updating a stored Gi to a new value of Gi, the verifying entity may also authenticate the Gi or its associated identity using a signature of the device, to ensure that the new identity and Gi value have been received from the device and not from a third party. Verifying a signature sent with the new identity and Gi counter ensures that a third party cannot run a denial of service attack by falsely regenerating the device identity. The signature is generated with the device private key and so cannot be falsified unless the device private key has been compromised.

As discussed above, the phonebook may serve as a reference for a range of services, or the public key of a device may be configured into a service manually, and the service may itself verify that an identity provided by the device is generated from the device public key. In such cases, the service can itself maintain information about which generation of identity is currently being used by different devices subscribing to the service. The service may for example be configured only to accept connections from a device using a specific generation identity, so that if the device generates a new identity it will no longer be accepted by the service even if the new identity is bound to the correct public key. In some examples, it may be that a newer device identity should never be allowed access to subscription services of previous device identities, for example if a new identity is associated with a change of device ownership. This can be ensured by configuring a service to only accept a specific generation of device identity. In other examples, an account or subscription may be associated with a device public key, with different device identities being used to identify periods of a device lifetime. In such examples, multiple generations of identity based on the correct public key may be accepted by a service.

If a device owner wishes to transfer ownership of the device to another user, or for any other reason wishes to change the identity of the device, for example in order to use the device for a new purpose, it is desirable to ensure that the new owner will be unable to use the current identity. The current owner thus triggers an identity re-generation process in the device, according to which a new identity is generated by hashing the current identity: ID'=hash(ID), and the generation counter (Gi) is incremented by one to match the number of hash operations run on the public key in order to arrive at the new identity. Identity generation may be triggered using a command sent over the network, or for example by pushing a button on the device or by temporarily disconnecting the power source and then rebooting the device. The device stores the new identity and Gi in protected memory that can only be read. Write access to the protected memory is only granted for the re-generation process, which is limited to the generation of a new identity from the previous one and the incrementing of the generation counter Gi. In some examples, a new owner may also trigger an identity regeneration process, to ensure that the identity used by the device has not been used or registered anywhere at the time the device enters into use for the new owner.

It will be appreciated that while not used in all examples of the present invention, use of the generation counter Gi may assist with identity verification, by informing a server side entity how many hash iterations should be performed in order to check that an identity matches a public key. In addition, a check can be made to ensure the generation provided by the device is valid, by comparing it to the previously known generation and verifying that the provided Gi is the same as or greater than the previous one.

In some examples, a constrained device may always connect to the phonebook when a new identity is generated, communicating the new identity and/or Gi to the phonebook and so ensuring the phonebook always has a record of the current identity and identity generation used by the device. This may serve as a backup check for other network services which, if unsure as to whether a provided identity and Gi are valid, could refer to the phonebook to check the currently valid identity and generation number.

In order to protect against attacks where packets are modified on the path, for example in an attempt to use an old identity towards a service, the generation counter Gi may be included in control signaling together with the identity information. Either only the counter Gi, the hashed identity or a larger part of the message may be integrity or confidentiality protected using the device private key. In this manner, if the packet is modified by an on the path attacker, the modifications will lead to a signature mismatch; the modified information, identity and Gi, will not match and the service will know that the identity provided is not valid.

The above overview illustrates how aspects of the present invention enable the establishing and management of a new identity for a constrained device. The functionality discussed above may be implemented by methods running on a constrained device and network element, such as a phonebook/phonebook manager, Bootstrapping Server, network service or other network element.

FIG. 1 illustrates a first example of method 100 for establishing a new identity for a constrained device. The method, performed by the constrained device, includes the steps of applying a hash function to an existing identity and setting the resulting value as the new identity. The method may also include a range of additional steps which may provide additional advantages and/or different aspects of the above discussed functionality.

Referring to FIG. 1, in a first step 102, the example method 100 comprises receiving an instruction to generate a new identity. As discussed above, this instruction may be received via the network in the form of a network command, or may be received via physical actions carried out at the device, including for example pushing an identity reset button or disconnecting and reconnecting a device power source. On receipt of the instruction at step 102, the constrained device may then authenticate the instruction at step 104. This may be particularly appropriate for instructions received as commands over the network. The constrained device may ensure that the command has been received from an entity authorised to instruct generation of a new identity, in order to avoid being triggered by an unauthorised third party into generating a new identity.

Having authenticated the instruction to generate a new identity, the constrained device then applies a hash function to its existing identity at step 106, and sets the resulting value as the new device identity in step 108. These steps may be carried out in the constrained device's trusted execution and storage environment. As discussed above, the existing identity of the device is at least a first generation hash value of a hash chain formed by applying the hash function to the device public key. The constrained device may also increment an identity generation counter Gi by one, and store the new identity and generation counter in secure storage.

As discussed above, each time a new identity is generated in the constrained device, it may provide this identity to a control or management node such as the phonebook previously discussed. The method 100 may thus further comprise generating a signature using the device private key in step 114 and signing at least one of the new identity or the identity generation counter with the generated signature in step 116. The method then comprises sending the signed new identity and generation counter to the control node, where they may be verified, authenticated and stored. The constrained device may at some later time receive a request for its identity in step 120, for example from a service to which it is subscribed. The device then replies to this request at step 122 by sending both its new identity and the identity generation counter, either or both of which may be signed with the signature generated at step 114. If the signature is calculated over the entire packet containing the identity, for example including IP addresses, then the signature may be generated each time the device sends its identity to a service. This may also be the case if the device receives a nonce from the service, as discussed below. In other examples, the same signature may be used. In such cases, the signed identity is similar to a certificate, with the device acting as its own certification authority for creating this "certificate" of its identity. The device may thus continue to use its new identity, supported in some examples by the identity generation counter, until another instruction to generate a new identity is received.

In some examples, a constrained device may receive a nonce or other element from a service together with a request for the device's identity. In such examples, in addition to signing the device identity and/or generation counter, the constrained device may also sign the nonce to prove freshness. In this manner the device is required to generate the signature for each service, or possibly each session, separately and with a unique input (the service nonce). This protects against reuse of a signed counter and/or identity.

Figure 2:
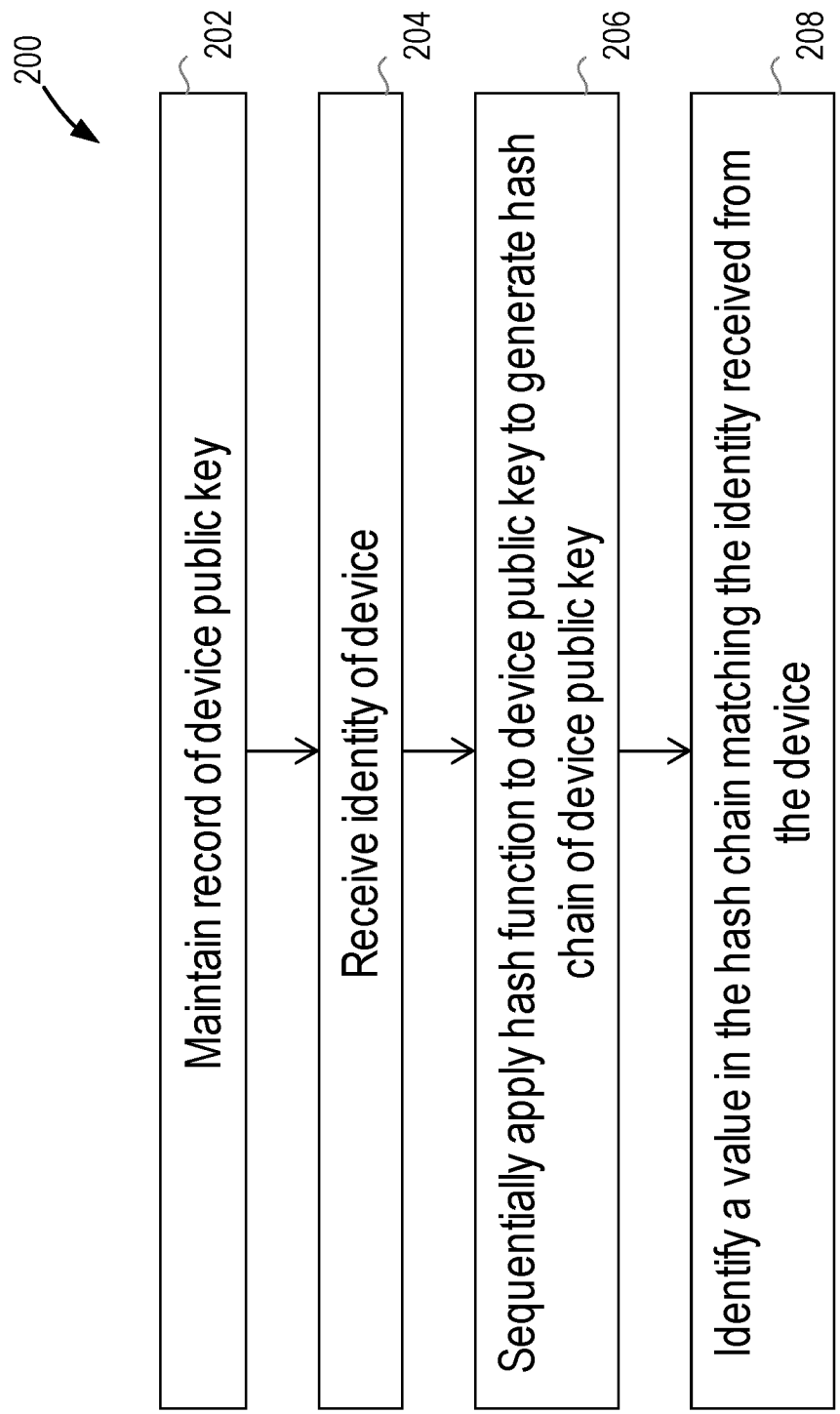
FIG. 2 is a flow chart illustrating process steps in a method for managing an identity of a constrained device.

FIG. 2 illustrates a first example of a method 200 for managing an identity of a constrained device. The method may be conducted in a control or management node such as a Bootstrapping Server or phonebook/phonebook manager, or may be conducted in a network service function or other network element. Referring to FIG. 2, in a first step 202 the method comprises maintaining a record of a device public key for a constrained device. The method then comprises receiving an identity of the device in step 204. In step 206, the method comprises sequentially applying a hash function to the device public key to generate a hash chain of the device public key. Finally, in step 208, the method comprises identifying a hash value in the hash chain matching the identity received from the device. In some examples, the method may comprise generating the entire hash chain up to a predetermined limiting number of elements at start up, and then comparing the individual values in the hash chain to an identity when an identity is received. In other examples, as discussed in further detail below, the method may comprise dynamically calculating hash chain values and comparing them to a received identity when an identity is received.

Figure 3:
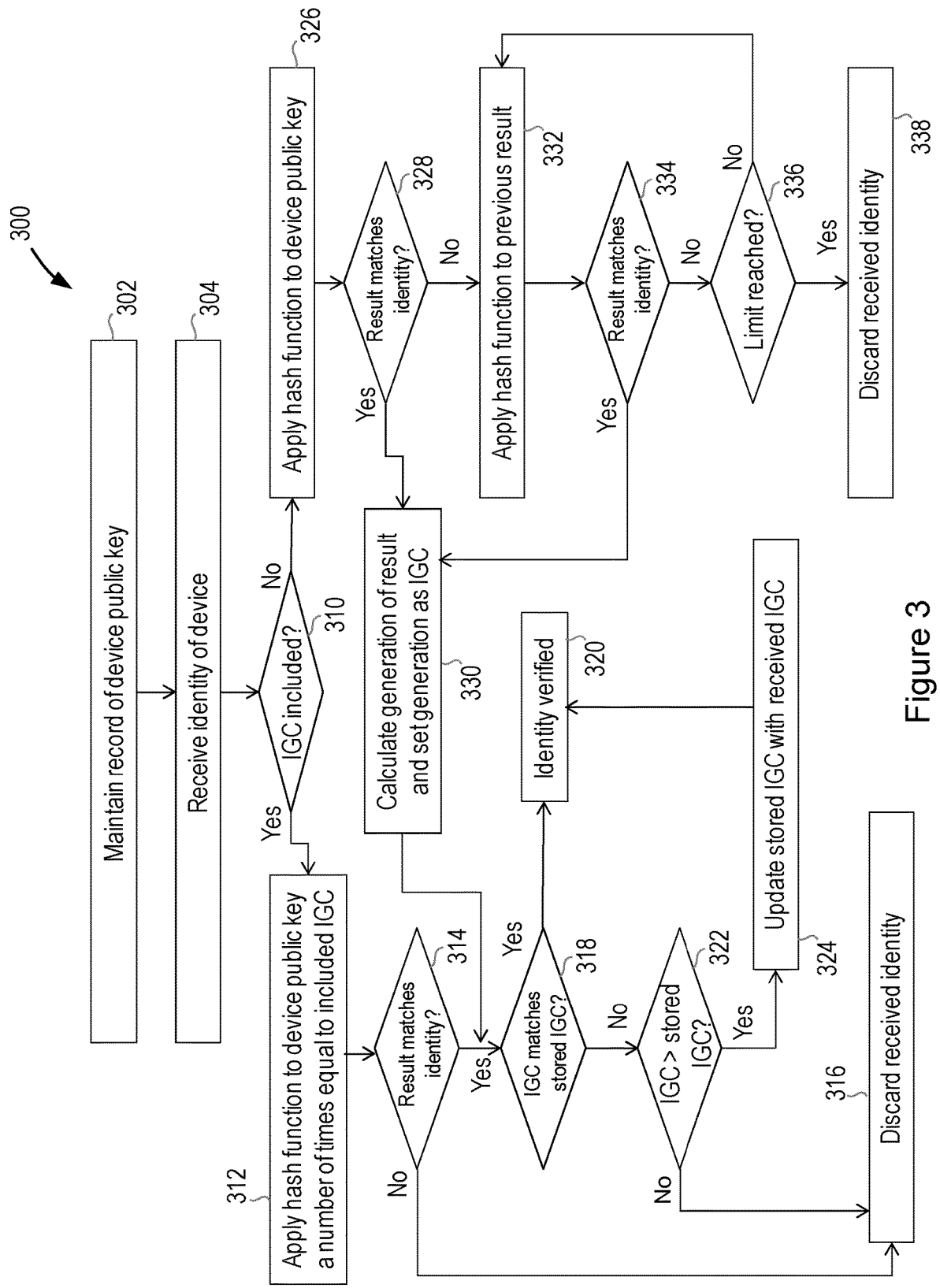
FIG. 3 is a flow chart illustrating process steps in another example of method for managing an identity of a constrained device.
Figure 4:
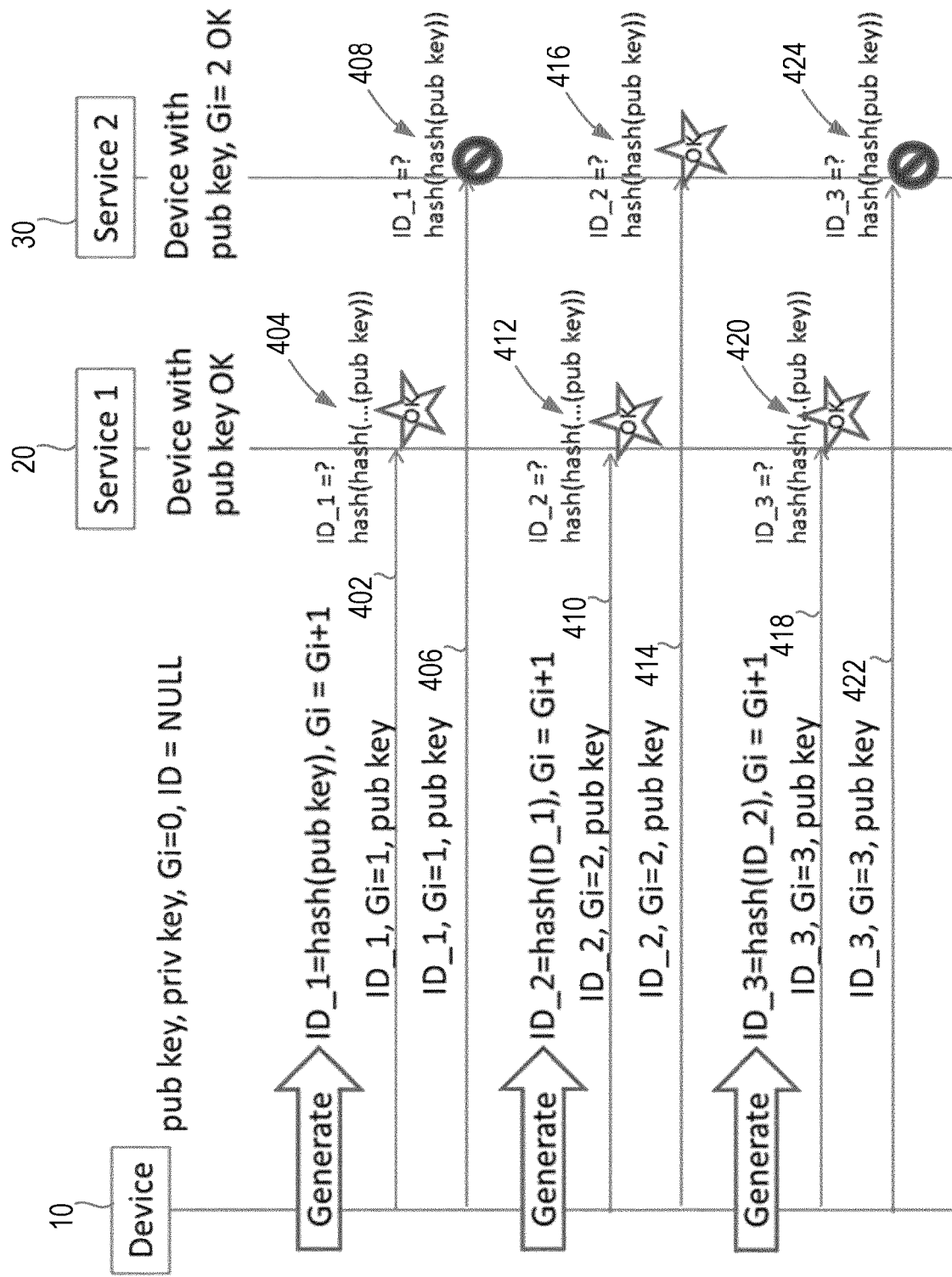
FIG. 4 is a signalling diagram illustrating another example of method for managing an identity of a constrained device.

FIGS. 3 and 4 illustrate other examples of methods 300, 400 for managing an identity of a constrained device. Each of methods 300 and 400 incorporate the steps of the method 200, sometimes via division into sub steps, as well as incorporating additional steps which may provide additional advantages or other aspects of the functionality discussed in the overview provided above. FIG. 3 illustrates process steps in a method 300 conducted in a control node which may for example be a Bootstrapping Server or a phonebook/phonebook manager. In the following discussion, the method is described with reference to being conducted in a Bootstrapping Server.

Referring to FIG. 3, in a first step 302, the Bootstrapping Server maintains a record of the constrained device public key. This record may be local or may be external, and may for example be held in a phonebook to which the Bootstrapping Server has access. In step 302, the Bootstrapping Server receives an identity of the device. In step 310, the Bootstrapping Server checks whether or not an identity generation counter (IGC) Gi is included with the identity. If a generation counter Gi is included with the identity, then the Bootstrapping Server proceeds to apply a hash function to the device public key a number of times equal to the value of the included generation counter at step 312, so generating a hash chain with a number of elements (and hence generations) equal to the value of the generation counter. As an alternative to calculating the entire hash chain in step 312, the Bootstrapping Server may check whether a part of the hash chain has already been calculated, for example if a previous identity for the device has been verified. If this is the case, then the Bootstrapping Server may retrieve the previously generated hash value and may apply the hash function to the value the number of times necessary to arrive at a generation equal to the received generation counter. Thus if a hash chain of n elements has already been calculated, and a generation counter of value n+1 is received in step 304, the Bootstrapping Server may retrieve the hash value of the n-element hash chain and perform a single additional application of the hash function. Having generated the hash chain with the correct number of elements equal to the received generation counter, the Bootstrapping Server then checks at step 314 whether the resulting hashed value matches the identity received in step 304. If the hashed value does not match the received identity then either the generation counter does not match the received identity, or the received identity is not based upon the device public key. In either case the Bootstrapping Server discards the received identity as invalid in step 316.

If the hashed result matches the received identity then the Bootstrapping Server proceeds to check whether the received generation counter matches a stored generation counter in step 318. As previously, the generation counter may be stored locally or externally, for example in a phonebook. If the received generation counter matches the stored generation counter then the Bootstrapping Server concludes that the identity has been successfully verified at step 320. If the received generation counter does not match the stored generation counter then the Bootstrapping Server checks whether the received generation counter is higher than the stored generation counter at step 322. If this is the case, then the Bootstrapping Server concludes that it is being notified with a new identity for the device and updates the stored generation counter with the newly received generation counter in step 324. The Bootstrapping Server may also store the new identity. The Bootstrapping Server then concludes at step 320 that the device identity has been successfully verified. Checking that the generation counter is higher than the stored generation counter ensures that only a later generation will be stored, so that an old identity cannot be re-initiated. If the received generation counter is lower than the stored generation counter, then the identity received is an old identity which has since been replaced. The Bootstrapping Server therefore discards the received identity. The Bootstrapping Server may perform an additional signature check using the device public key before updating the stored generation counter, as discussed in greater detail below.

Returning to step 310, if a generation counter is not included with the received identity, then the Bootstrapping Server proceeds at step 326 to apply the hash function to the device public key. The Bootstrapping Server then checks in step 328 whether or not the resulting hashed value matches the received identity. If the hashed value matches the received identity, then the Bootstrapping Server proceeds in step 330 to calculate the generation of the result (in this case 1) and set the generation result as the generation counter. The Bootstrapping Server then follows steps 318 to 320 or to 316, checking whether the calculated generation counter matches or is greater than the stored generation counter and acting accordingly, as discussed above. If the hashed result does not match the received identity in step 328, then the Bootstrapping Server applies the hash function to the previous result and checks again whether the new hashed result matches the received identity in step 334.

If the hashed result matches the received identity, the Bootstrapping Server calculates the generation of the identity in step 330 and proceeds to check the calculated generation against a stored generation counter as discussed above. If the hashed result still does not match the received identity, the Bootstrapping Server checks whether a predetermined limit for applying the hash function has been reached in step 336. If the limit has been reached then the Bootstrapping Server discards the received identity in step 338. If the limit has not yet been reached then the Bootstrapping Server returns to step 332 and again applies the hash function to the previous result and repeats the check at step 334. In this manner, the Bootstrapping Server generates a hash chain based on the device public key and checks each value of the hash chain against the received identity until either a match with the received identity is found or a predetermined limit is reached. The Bootstrapping Server then either continues with generation counter checks or discards the identity as appropriate.

It will be appreciated that a signature check may be included in the method 300 of FIG. 3, for example on receipt of the identity at step 304 and/or before updating a stored generation counter in step 324 and/or at other stages of the method. The signature may be generated by the constrained device using its private key and verified by the Bootstrapping Server using the device public key to ensure that the device sending the new identity and generation counter validly owns the identity. Such a signature check may prevent a denial of service type attack, in which a third party attempts to falsely regenerate a device identity.

FIG. 4 is a message sequence diagram depicting another example of a method 400 of managing an identity of a constrained device. The method 400, carried out in network elements in the form of network service functions, is illustrated via message exchanges between a constrained device 10 and first and second network service functions 20, 30. The method 400 thus runs concurrently on each of the service functions.

In the example message sequence of FIG. 4, the constrained device 10 generates three identities during its lifetime and tries to access two different services; a first service 20 which accepts a device having the device public key, and a second service 30 which only accepts a device with a second generation identifier based on the device public key. As can be seen from the Figure, the first service 20 runs a number of hash operations on the public key to verify that the provided identity is generated from the correct public key and then accepts the device. However, the second service 30 only accepts second generation identifiers, so it always checks whether or not running two hash operations on the public key yields the provided identity. The second service could also check a generation counter received with the device identity but it should also verify that the received identity matches the received generation counter, that is the service should perform two hash operations on the public key and check that the result matches the received identity. In practice, the service may run the two hash operations the first time an identity of the device is presented to it, and may then store the expected hash value/identity with the device public key. When a subsequent identity message arrives, the service may check if it is to serve any device with the presented identity, and may therefore find the public key that matches the identity, if this is available. Alternatively, the service may find the already calculated second generation hash value, based on the public key included in the message from the device, and compare the second generation hash value to the presented identity.

If the generation of the identity is not known, which might be the case for the first service, the service may calculate up to a predefined limit of hash iterations to verify the identity. The hash operation is not computationally demanding so calculating up to for example 100 values would not be overly demanding. However, using the Gi value in the communication may optimise the process, avoiding the need for a comparison step following calculation of each new value in the hash chain.

Referring to FIG. 4, the device 10 is installed with an asymmetric key pair and initially has no identity, with the identity generation counter Gi at 0. The device 10 then generates a first identity ID_1 and increments the generation counter. The identity and generation counter are received by the first service 20 in step 402 and by the second service 30 in step 406. The first service verifies simply that the identity is based upon the public key of the device and accepts the device in step 404. The second service 30 checks whether the received identity is a second generation identity. As this is not the case, the second service rejects the device in step 408. The device then receives instruction to generate a new identity. The device 10 generates a second identity ID_2 by hashing the first identity, and increments the generation counter. The new identity and generation counter are received by the first service 20 in step 410 and by the second service 30 in step 414. As previously, the first service 20 verifies simply that the identity is based upon the public key of the device and accepts the device in step 412. The second service 30 checks whether the received identity is a second generation identity. ID_2 is a second generation identity, and the second service 30 therefore accepts the device in step 416. The device then receives another instruction to generate a new identity. The device 10 generates a third identity by hashing the second identity, and increments the generation counter. The new identity and generation counter are received by the first service 20 in step 418 and by the second service 30 in step 422. As previously, the first service 20 verifies simply that the identity is based upon the public key of the device and accepts the device in step 420. The second service 30 checks whether the received identity is a second generation identity. As this is now not the case, the second service 30 rejects the device at step 424.

FIG. 4 illustrates one way in which methods for managing a constrained device identity according to examples of the present invention may be used in network services to provide conditional access to those services for constrained devices, access being conditional upon successful verification of device identity and/or identity generation. In further examples (not shown), services may perform additional checks before accepting a constrained device. For example, the first service described above may, on verifying that the received identity is generated from the public key of the device, additionally check that the identity is an identity that is to be served and may also authenticate the identity, for example using a private key signature attached to the identity or using some other protocol.

In the above discussed methods 100, 200, 300, 400, the constrained device may communicate with the network element (Bootstrapping server, network service function etc) using for example CoAP or HTTP protocols. EAP-TLS (defined in RFC 5216) is an EAP authentication protocol and is another protocol option for the constrained device communication with a network element according to the methods 100, 200, 300, 400. Once authenticated to the server, the constrained device may establish a secure connection such as. HTTPS via TLS, after which it may send HTTP GET/PUT etc messages over the secure connection.

Figure 5:
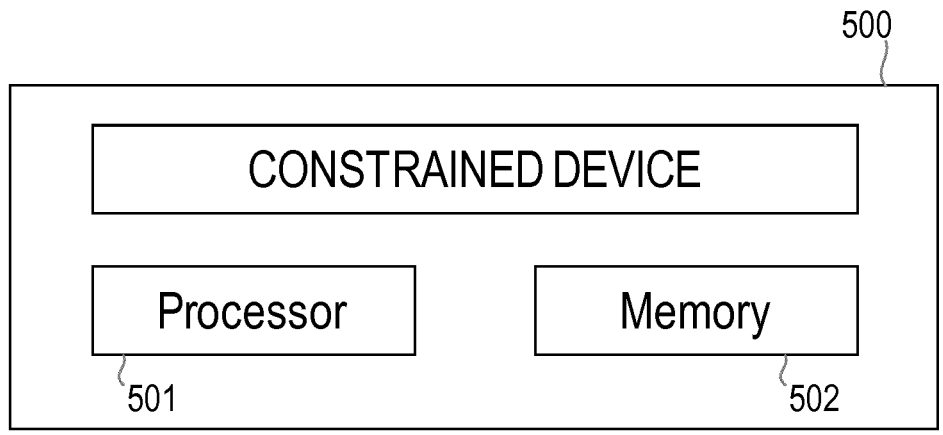
FIG. 5 is a block diagram illustrating functional units in a constrained device.
Figure 6:
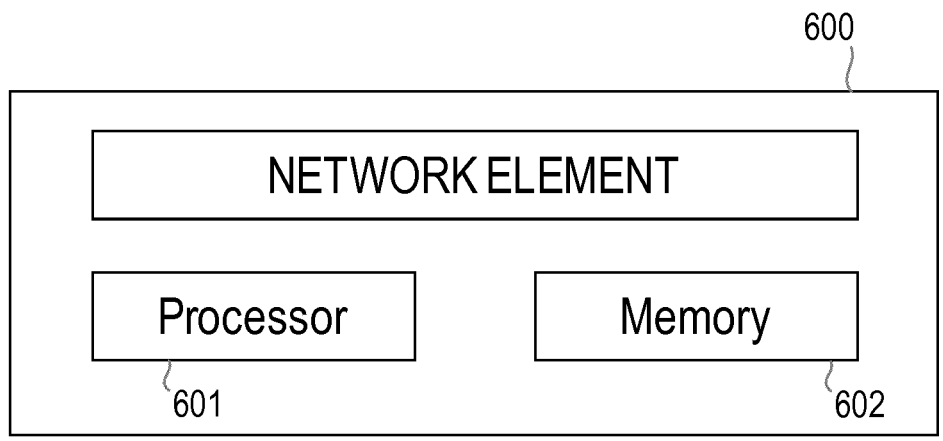
FIG. 6 is a block diagram illustrating functional units in a network element.

The methods of the present invention, as illustrated by the above examples, may be conducted in a constrained device or a network element, which may be a control or management node such as a Bootstrapping Server or phonebook/phonebook manager or a network service function or other network element. The methods may be conducted on receipt of suitable computer readable instructions, which may be embodied within a computer program running on the constrained device or network element. FIGS. 5 and 6 illustrate first examples of constrained device and network element which may execute the methods of the present invention, for example on receipt of suitable instructions from a computer program. Referring to FIGS. 5 and 6, each of the constrained device 500 and network element 600 comprises a processor 501, 601, and a memory 502, 602. The memory 502, 602 contains instructions executable by the processor 501, 601 such that the constrained device 500 is operative to carry out examples of the method 100, and the network element 600 is operative to carry out examples of the methods 200, 300, 400.

Figure 7:
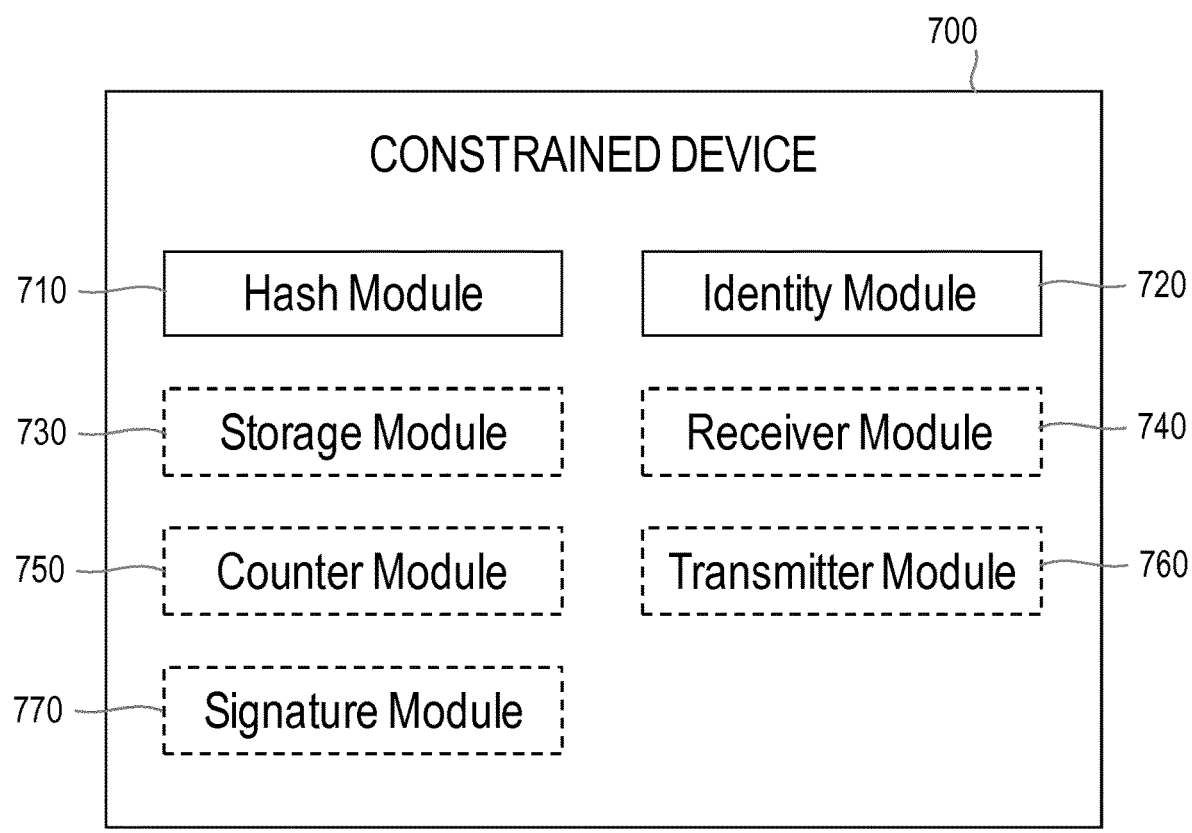
FIG. 7 is a block diagram illustrating functional units in another example of constrained device.

FIG. 7 illustrates functional units in another embodiment of constrained device 700 which may execute the method 100, for example according to computer readable instructions received from a computer program. It will be understood that the units illustrated in FIG. 7 are software implemented functional units, and may be realised in any appropriate combination of software modules.

Referring to FIG. 7, the constrained device 700 has an existing identity and is associated with an asymmetric key pair comprising a device public key and a device private key. The device 700 comprises a hash module 710 for applying a hash function to the existing identity, and an identity module 720 for setting the resulting value as the new identity for the constrained device. The device may further comprise a storage module 730 for storing the new identity in a secure storage in the constrained device. The device 700 may also comprise a receiver module 740 for receiving an instruction to generate a new identity and a transmitter module 760 for sending the new identity to a control node. The device 700 may also comprise a counter module 750 for incrementing an identity generation counter.

The receiver module 740 may also be for receiving a request for device identity from a communication network function, and the transmitter module 760 may also be for sending the new identity and the identity generation counter to the communication network function. In addition, the transmitter module 760 may also be for sending the identity generation counter to a control node.

The device 700 may further comprise a signature module 770 for generating a signature using the device private key, and for signing at least one of the new identity or the identity generation counter. The transmitter module 760 may also be for sending the signed new identity or identity generation counter.

In one example, the above described modules may be implemented with help from a computer program which, when run on a processor, causes the above described modules to cooperate to carry out examples of the method 100 as described above.

Figure 8:
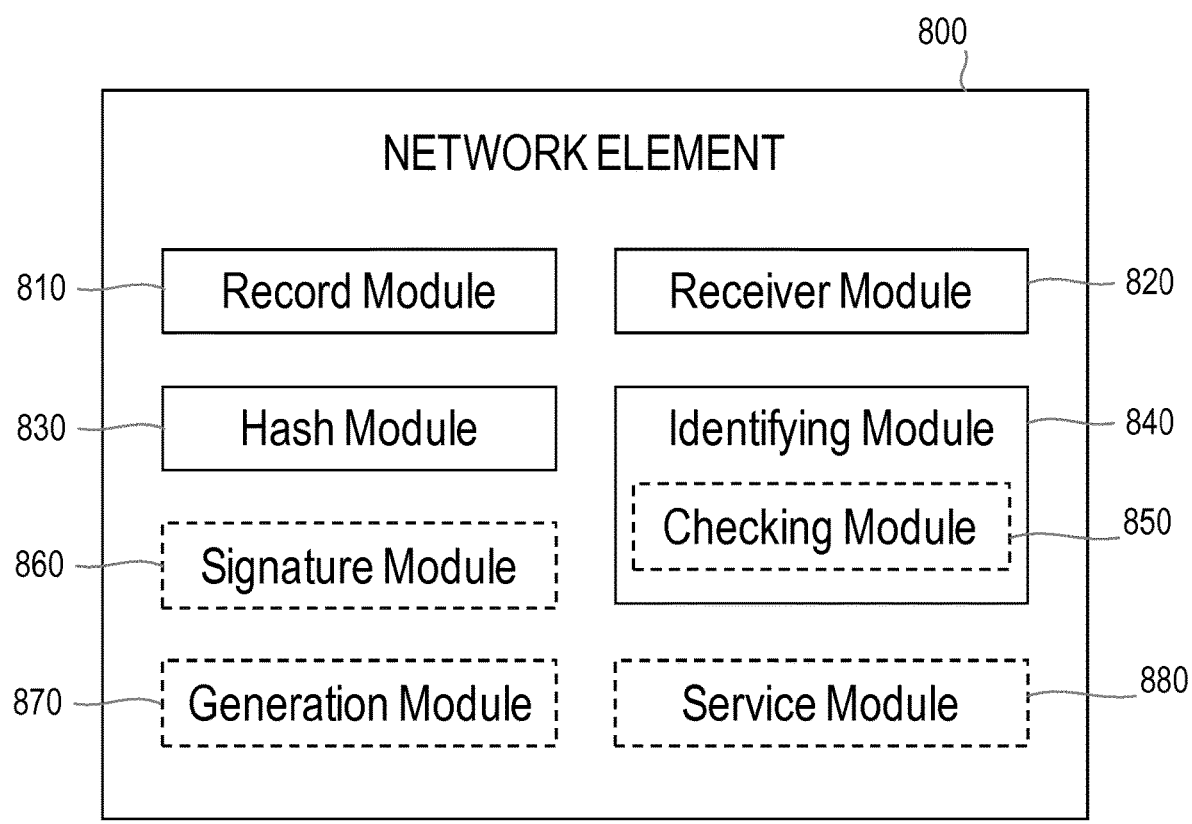
FIG. 8 is a block diagram illustrating functional units in another example of network element.

FIG. 8 illustrates functional units in another embodiment of network element 800 which may execute the methods 200, 300, 400, for example according to computer readable instructions received from a computer program. It will be understood that the units illustrated in FIG. 8 are software implemented functional units, and may be realised in any appropriate combination of software modules. The network element may for example be a control or management node such as a Bootstrapping Server or phonebook/phonebook manager or a network service function or other network element.

Referring to FIG. 8, the network element 800 comprises a record module 810 for maintaining a record of a device public key, a receiver module 820 for receiving an identity from the device, a hash module 830 for sequentially applying a hash function to the device public key to generate a hash chain of the device public key, and an identifying module 840 for identifying a hash value in the hash chain matching the identity received from the device. The identifying module 840 may comprise a checking module 850 for checking each value in the generated hash chain against the received identity until a matching value is discovered, up to a predetermined generation limit of the hash chain.

The receiver module 820 may also be for receiving an identity generation counter from the device with the identity, and the hash module 830 may also be for sequentially applying the hash function to the device public key a number of times equal to the received identity generation counter. The identifying module 840 may be for checking the resulting hash chain value against the received identity.

The receiver module 820 may also be for receiving a signature from the device, the signature being generated with the device private key and the network element may further comprise a signature module 860 for verifying the signature with the device public key and for discarding the received identity if the verification is unsuccessful. The network element 800 may also comprise a generation module 870 for determining a generation of the identified value in the hash chain and for storing the generation with the device public key in the record. The generation module 870 may also be for checking the determined generation against an existing stored generation, and the network element may further comprise a storage module for replacing the existing stored generation with the determined generation if the determined generation is higher than the existing stored generation.

The network element 800 may further comprise a service module 880 for allowing the device access to a service on successful identification of a hash value in the hash chain matching the identity received from the device. The service module 880 may allow the device access to a service if the determined generation matches the stored identity generation counter, in addition to successful identification of a hash value in the hash chain matching the identity received from the device.

In one example, the above described modules may be implemented with help from a computer program which, when run on a processor, causes the above described modules to cooperate to carry out examples of the methods 200, 300, 400 as described above.

Aspects of the present invention thus provide methods according to which the identity of a constrained device may be updated, for example following a change of ownership, without compromising the security of the identity by allowing user access to a secured storage and execution environment, where for example an asymmetric key pair may be stored.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for managing and establishing a new identity for a constrained device, the constrained device having an existing identity and being associated with an asymmetric key pair comprising a device public key and a device private key, the method comprising:

receiving an instruction to generate the new identity for the constrained device;

verifying authenticity of the received instruction to generate the new identity;
in response to successful authentication of the received instruction, applying a hash function to the existing identity;
setting a resulting value as the new identity for the constrained device,
wherein the existing identity comprises at least a first generation hash value in a hash chain formed by applying the hash function to the device public key;
incrementing an identity generation counter;
sending the new identity and the identity generation counter to a first network service function and a second network service function, wherein the identity generation counter indicates a number of times the hash function is applied to the device public key to generate the new identity, wherein the first network service function only accepts a device having the device public key, and wherein the second network service function only accepts a device with a second generation identity;
verifying, by the first network service function, that the new identity received by the first network service function is generated from the device public key, by applying a plurality of hash operations on the received new identity;
accepting the constrained device by the first network service function after verifying that the received new identity is generated from the device public key and verifying that the received new identity is an identity that is to be served, based on the device private key;
verifying, by the second network service function, that the new identity received by the second network service function is a second generation identity by determining that application of two hash operations on the device public key yields the received new identity; and
accepting the constrained device by the second network service function, when it is verified that the received new identity is the second generation identity.

2. The method of claim 1, further comprising storing the new identity in a secure storage in the constrained device.

3. The method of claim 1, further comprising:
receiving a request for a device identity from a communication network function; and
sending the new identity and the identity generation counter to the communication network function.

4. A system for managing and establishing an identity for a constrained device, the system comprising:
the constrained device having an existing identity and being associated with an asymmetric key pair comprising a device public key and a device private key, the constrained device comprising:
a receiver configured to receive an instruction to generate a new identity for the constrained device;
a processor;
a memory, the memory comprising instructions which, when executed by the processor, cause the processor to:
verify authenticity of the received instruction to generate the new identity; in response to successful authentication of the received instruction, apply a hash function to the existing identity; and
set a resulting value as the new identity for the constrained device, wherein the existing identity comprises at least a first generation hash value in a hash chain formed by application of the hash function to the device public key;
a counter configured to increment an identity generation counter; and
a transmitter configured to send the new identity and the identity generation counter to a first network service function and a second network service function of a network element, wherein the identity generation counter indicates a number of times the hash function is applied to the device public key to generate the new identity, wherein the first network service function only accepts a device having the device public key, and wherein the second network service function only accepts a device with a second generation identity; and
the network element comprising the first network service function and the second network service function, and further comprising:
a receiver for receiving the new identity and the identity generation counter;
a processor; and
a memory, the memory of the network element comprising instructions which, when executed by the processor of the network element, cause the processor of the network element to:
verify, by the first network service function, that the received new identity is generated from the device public key, by applying a plurality of hash operations on the received new identity;
accept the constrained device by the first network service function after verifying that the received new identity is generated from the device public key and verifying that the received new identity is an identity that is to be served, based on the device private key;
verify, by the second network service function, that the received new identity is a second generation identity by determining that application of two hash operations on the device public key yields the received new identity; and
accept the constrained device by the second network service function, when it is verified that the received new identity is the second generation identity.

5. The system of claim 4, wherein the memory of the constrained device is configured to store the new identity in a secure storage in the constrained device.

6. The system of claim 4, wherein the receiver of the constrained device is further configured to receive a request for a device identity from a communication network function, and
wherein the transmitter is further configured to send the new identity and the identity generation counter to the communication network function.

7. A network element for managing an identity of a constrained device, the constrained device being associated with an asymmetric key pair comprising a device public key and a device private key, the network element comprising:
a receiver configured to receive the identity from the constrained device;
a processor; and
a memory, the memory comprising instructions which, when executed by the processor, cause the processor to:
maintain a record of the device public key;
check whether an identity generation counter is included with the received identity;
when the identity generation counter is included with the received identity, sequentially apply a hash function to the device public key a number of times equal to a value in the identity generation counter, to generate a hash chain of the device public key;

check whether a resulting hashed value matches the received identity;

when the resulting hashed value matches the received identity, check whether the identity generation counter matches a stored identity generation counter; and update the stored identity generation counter with the identity generation counter when the identity generation counter is higher than the stored identity generation counter, wherein to the update the stored identity generation counter, the processor is further configured to increment the stored identity generation counter.

* * * * *